US 9,086,737 B2

(12) United States Patent
Smith et al.

(10) Patent No.: US 9,086,737 B2
(45) Date of Patent: Jul. 21, 2015

(54) DYNAMICALLY CONTROLLED KEYBOARD

(75) Inventors: Eric G Smith, San Jose, CA (US);
Gavin J Reid, Campbell, CA (US)

(73) Assignee: Apple Inc., Cupertino, CA (US)

( * ) Notice: Subject to any disclaimer, the term of this patent is extended or adjusted under 35 U.S.C. 154(b) by 1463 days.

(21) Appl. No.: 11/685,567

(22) Filed: Mar. 13, 2007

(65) Prior Publication Data
US 2008/0001787 A1    Jan. 3, 2008

Related U.S. Application Data

(60) Provisional application No. 60/814,363, filed on Jun. 15, 2006.

(51) Int. Cl.
| | | |
|---|---|---|
| *H03M 11/00* | (2006.01) | |
| *G06F 3/023* | (2006.01) | |
| *H01H 13/83* | (2006.01) | |
| *H01H 13/88* | (2006.01) | |

(52) U.S. Cl.
CPC ............. *G06F 3/0238* (2013.01); *H01H 13/83* (2013.01); *H01H 13/88* (2013.01); *H01H 2219/016* (2013.01); *H01H 2219/037* (2013.01); *H01H 2229/00* (2013.01)

(58) Field of Classification Search
CPC ...................................................... H02M 11/00
USPC ...................................... 341/20–23; 200/314
See application file for complete search history.

(56) References Cited

U.S. PATENT DOCUMENTS

| | | | |
|---|---|---|---|
| 3,885,490 A * | 5/1975 | Gullickson | ................ 84/470 R |
| 4,207,087 A * | 6/1980 | Morrison et al. | ................ 463/9 |
| 4,400,593 A * | 8/1983 | Kunz | ............................ 200/5 A |
| 4,714,823 A | 12/1987 | Spruck et al. | |
| 4,769,753 A | 9/1988 | Knudson et al. | |
| 4,845,311 A | 7/1989 | Schreiber et al. | |
| 4,855,740 A * | 8/1989 | Muramatsu et al. | ............ 341/23 |
| 5,040,479 A | 8/1991 | Thrash | |
| 5,081,482 A | 1/1992 | Miki et al. | |
| 5,245,734 A | 9/1993 | Issartel | |

(Continued)

FOREIGN PATENT DOCUMENTS

| | | |
|---|---|---|
| FR | 2801402 | 5/2001 |
| GB | 2433211 | 6/2007 |

(Continued)

OTHER PUBLICATIONS

Rojas, "Optimus keyboard trumped by the Display keyboard?," retrieved from the Internet at http://www.engadget.com/2005/07/29/optimus-keyboard-trumped-by-the-display-keyboard/, Jul. 29, 2005.

(Continued)

*Primary Examiner* — Amine Benlagsir
(74) *Attorney, Agent, or Firm* — Brownstein Hyatt Farber Schreck, LLP

(57) ABSTRACT

Methods and apparatus, including computer program products, implementing and using techniques for providing a computer peripheral including one or more keys. Each key has several light emitting diodes disposed on a face of the key. Each of the light emitting diodes can switch on or off in response to a data signal received from an application specific integrated circuit dedicated to the key. A corresponding key and manufacturing method, as well as a computer system including one or more such keys are also described.

18 Claims, 4 Drawing Sheets

(56) References Cited

U.S. PATENT DOCUMENTS

| | | | |
|---|---|---|---|
| 5,317,105 A | 5/1994 | Weber | |
| 5,342,991 A | 8/1994 | Xu et al. | |
| 5,371,901 A | 12/1994 | Reed et al. | |
| 5,497,181 A | 3/1996 | Paoli | |
| 5,523,755 A * | 6/1996 | Wooten | 341/22 |
| 5,583,560 A | 12/1996 | Florin et al. | |
| 5,726,645 A | 3/1998 | Kamon et al. | |
| 5,770,898 A | 6/1998 | Hannigan et al. | |
| 5,815,379 A | 9/1998 | Mundt | |
| 5,951,908 A | 9/1999 | Cui et al. | |
| 5,975,953 A | 11/1999 | Peterson | |
| 6,130,822 A | 10/2000 | Della Fiora et al. | |
| 6,147,664 A | 11/2000 | Hansen | |
| 6,180,048 B1 | 1/2001 | Katori | |
| 6,271,825 B1 | 8/2001 | Greene et al. | |
| 6,337,678 B1 | 1/2002 | Fish | |
| 6,525,929 B2 | 2/2003 | Carr | |
| 6,532,446 B1 | 3/2003 | King | |
| 6,704,004 B1 * | 3/2004 | Ostergård et al. | 345/170 |
| 6,713,672 B1 | 3/2004 | Stickney | |
| 6,794,992 B1 | 9/2004 | Rogers | |
| 6,800,805 B2 | 10/2004 | Deguchi | |
| 6,834,294 B1 * | 12/2004 | Katz | 709/203 |
| 6,836,651 B2 | 12/2004 | Segal et al. | |
| 6,897,884 B2 | 5/2005 | Tsuge et al. | |
| 6,914,551 B2 | 7/2005 | Vidal | |
| 6,922,811 B1 * | 7/2005 | Leung et al. | 715/259 |
| 6,995,752 B2 | 2/2006 | Lu | |
| 7,008,090 B2 | 3/2006 | Blank | |
| 7,030,956 B2 | 4/2006 | Nishi et al. | |
| 7,058,900 B2 * | 6/2006 | Sugano | 715/773 |
| 7,109,465 B2 | 9/2006 | Kok et al. | |
| 7,167,083 B2 | 1/2007 | Giles | |
| 7,211,734 B2 | 5/2007 | Bracaleone | |
| 7,236,154 B1 | 6/2007 | Kerr et al. | |
| 7,256,552 B2 | 8/2007 | Ishii et al. | |
| 7,274,303 B2 | 9/2007 | Dresti et al. | |
| 7,315,908 B2 * | 1/2008 | Anderson | 710/62 |
| 7,322,731 B2 | 1/2008 | Epstein et al. | |
| 7,347,712 B2 | 3/2008 | O'Connell et al. | |
| 7,468,722 B2 | 12/2008 | Ferguson | |
| 7,470,862 B2 | 12/2008 | Lin et al. | |
| 7,470,866 B2 | 12/2008 | Dietrich et al. | |
| 7,473,139 B2 | 1/2009 | Barringer et al. | |
| 7,501,960 B2 | 3/2009 | Price et al. | |
| 7,608,774 B2 * | 10/2009 | Ohmura et al. | 84/470 R |
| 7,634,263 B2 | 12/2009 | Louch et al. | |
| 7,656,371 B2 | 2/2010 | Shimizu et al. | |
| 7,679,828 B2 | 3/2010 | Munro | |
| 7,683,263 B2 | 3/2010 | Chiang | |
| 7,710,397 B2 | 5/2010 | Krah et al. | |
| 7,747,950 B2 * | 6/2010 | Lee | 715/259 |
| 7,750,282 B2 | 7/2010 | Mahowald et al. | |
| 7,769,353 B2 | 8/2010 | Dietrich et al. | |
| 7,835,164 B2 | 11/2010 | Lyle | |
| 2002/0087605 A1 * | 7/2002 | Su et al. | 707/542 |
| 2003/0132915 A1 * | 7/2003 | Mitchell | 345/168 |
| 2003/0174072 A1 | 9/2003 | Salomon | |
| 2003/0184451 A1 * | 10/2003 | Li | 341/22 |
| 2003/0234768 A1 * | 12/2003 | Rekimoto et al. | 345/169 |
| 2004/0230912 A1 | 11/2004 | Clow et al. | |
| 2004/0238195 A1 | 12/2004 | Thompson | |
| 2004/0243389 A1 * | 12/2004 | Thomas et al. | 704/1 |
| 2005/0024340 A1 * | 2/2005 | Bathiche | 345/170 |
| 2005/0156899 A1 * | 7/2005 | O'Dell | 345/171 |
| 2005/0200286 A1 | 9/2005 | Stoschek et al. | |
| 2005/0253821 A1 * | 11/2005 | Roeder | 345/173 |
| 2005/0289481 A1 * | 12/2005 | Chang et al. | 715/825 |
| 2006/0248459 A1 * | 11/2006 | Su | 715/703 |
| 2007/0019394 A1 | 1/2007 | Park et al. | |
| 2007/0050054 A1 | 3/2007 | Guruparan et al. | |
| 2007/0055143 A1 | 3/2007 | Deroo et al. | |
| 2007/0124772 A1 | 5/2007 | Bennett et al. | |
| 2007/0174058 A1 | 7/2007 | Burns et al. | |
| 2007/0188427 A1 * | 8/2007 | Lys et al. | 345/82 |
| 2008/0078921 A1 | 4/2008 | Yang et al. | |
| 2008/0094004 A1 | 4/2008 | Ackermann | |
| 2008/0111500 A1 | 5/2008 | Hoover et al. | |
| 2008/0291620 A1 | 11/2008 | DiFonzo et al. | |
| 2009/0002328 A1 | 1/2009 | Ullrich et al. | |
| 2009/0104898 A1 | 4/2009 | Harris | |
| 2009/0167704 A1 | 7/2009 | Terlizzi et al. | |
| 2009/0173533 A1 | 7/2009 | Brock et al. | |
| 2009/0173534 A1 | 7/2009 | Keiper et al. | |
| 2009/0176391 A1 | 7/2009 | Brock et al. | |
| 2009/0222270 A2 | 9/2009 | Likens et al. | |
| 2009/0277763 A1 | 11/2009 | Kyowski et al. | |
| 2010/0044067 A1 | 2/2010 | Wong et al. | |
| 2010/0081375 A1 | 4/2010 | Rosenblatt et al. | |
| 2010/0253228 A1 | 10/2010 | Hoover | |
| 2010/0253239 A1 | 10/2010 | Hoover | |
| 2010/0300856 A1 | 12/2010 | Pance et al. | |
| 2010/0301755 A1 | 12/2010 | Pance et al. | |
| 2010/0302169 A1 | 12/2010 | Pance et al. | |
| 2010/0306683 A1 | 12/2010 | Pance et al. | |

FOREIGN PATENT DOCUMENTS

| | | |
|---|---|---|
| JP | 58112263 | 7/1983 |
| JP | 04212289 | 8/1992 |
| JP | 04324294 | 11/1992 |
| JP | 05238309 | 9/1993 |
| JP | 06251889 | 9/1994 |
| JP | 06318050 | 11/1994 |
| JP | 07014694 | 1/1995 |
| JP | 10073865 | 3/1998 |
| JP | 2000098942 | 4/2000 |
| JP | 2005032470 | 2/2005 |
| JP | 2005293853 | 10/2005 |
| JP | 2006041043 | 2/2006 |
| KR | 2002013984 | 2/2002 |
| WO | WO01/69567 | 9/2001 |
| WO | WO02/073587 | 9/2002 |
| WO | WO2009/136929 | 11/2009 |
| WO | WO2010/058376 | 5/2010 |

OTHER PUBLICATIONS

"Optimus OLED Keyboard", Gizmodo: The Gadgets Weblog; downloaded Dec. 1, 2005 from http://www.gizmodo.com/gadgets/peripherals/input/optimus-oled-keyboard-112517.php.

"Electronic Polymers, Semiconducting Polymers and Light Emitting Polymers—Focus of Polythiophene", Azom.com, downloaded on Dec. 1, 2005 from http://www.azom.com/details.asp?ArticleID=2772.

"Polymer light-emitting diodes", Philips Research—Technologies; downloaded on Dec. 1, 2005 from http://www.research.philips.com/technologies/display/polyled/polyled/.

"What is PLED?—A Word Definition from the Webopedia Computer Dictionary", downloaded on Dec. 1, 2005 from http://www.webopedia.com/TERM/P/PLED/html.

"What is an OLED (Organic Light Emitting Diode)?", WiseGeek.com; downloaded on Dec. 1, 2005 from http://www.wisegeek.com/what-is-an-oled.htm?referrer=adwords_campaign=oled_ad=024 . . . .

"Organic light-emitting diode", Wikipedia.org; downloaded on Dec. 1, 2005 from http://en.wikipedia.org/wiki/OLED.

"Organic Polymers to Precede Nano Semi", EETimes.com; downloaded on Dec. 1, 2005 from http://www.eet.com/story/OEG20030923S0055.

"Long Polymers Light Up LEDs", Apr. 30, 2002, Physicsweb.org; downloaded on Dec. 1, 2005 from http://physicsweb.org/articles/news/6/4/22/1.

Physics News Update, Oct. 19, 1993, American Institute of Physics; downloaded on Dec. 1, 2005 from http://www.aip.org/pnu/1993/split/pnu1148-3.htm.

Braun et al., "Transient Response of Passive Matrix Polymer LED Displays", downloaded on Dec. 1, 2005 from http://www.ee.calpoly.edu/~dbraun/papers/ICSM2000BraunEricksonK177.html.

"Optimus OLED Keyboard with Customizable Layout", Gear Live; downloaded on Dec. 1, 2005 from http://www.gearlive.com/index.php/news.article/optimus_oled_keyboard_07131058/.

(56) References Cited

OTHER PUBLICATIONS

Optimus Russian Keyboard, Primo Tech; downloaded on Dec. 1, 2005 from http://primotechnology.com/index.php?art=articles/0705/optimus/index.htm.
Optimus Keyboard, Art.Lebedev Studio; downloaded on Dec. 1, 2005 from http://www.artlebedev.com/portfolio/optimus/.
International Search Report, PCT Application No. PCT/US2007/082799, Oct. 17, 2008.
International Search Report, PCT Application No. PCT/US2007/082799, Mar. 25, 2008.
Author Unknown, "RedEye mini Plug-in Universal Remote Adapter for iPhone, iPod touch and iPad," Amazon.com, 4 pages, date unknown.
Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.
IBM, "Additional Functionality Added to Cell Phone via "Learning" Function Button," www.ip.com, 2 pages, Feb. 21, 2007.
Kwon et al., "Haptic Interferences for Mobile Devices: a Survey of the State of the Art," Telerobotics and Control Laboratory, KAIST (Korea Advanced Institute of Science and Technology, Korea, Dec. 11, 2007.
Motorola TDB et al., "Universal Programmable Remote Control/Telephone," www.ip.com, 2 pages, May 1, 1992.
U.S. Appl. No. 12/542,386, filed Aug. 17, 2009.
U.S. Appl. No. 12/542,471, filed Aug. 17, 2009.
U.S. Appl. No. 12/683,255, filed Jan. 6, 2010.
U.S. Appl. No. 12/683,287, filed Jan. 6, 2010.
U.S. Appl. No. 12/814,113, filed Jun. 11, 2010.
U.S. Appl. No. 12/887,455, filed Sep. 21, 2010.
U.S. Appl. No. 12/887,745, filed Sep. 22, 2010.
U.S. Appl. No. 12/887,816, filed Sep. 22, 2010.
U.S. Appl. No. 12/890,034, filed Sep. 24, 2010.
U.S. Appl. No. 12/890,091, filed Sep. 24, 2010.
U.S. Appl. No. 12/895,526, filed Sep. 30, 2010.
U.S. Appl. No. 12/495,230, filed Jun. 30, 2010.
U.S. Appl. No. 12/495,353, filed Jun. 30, 2010.
U.S. Appl. No. 12/778,785, filed May 12, 2010.
U.S. Appl. No. 12/797,145, filed Jun. 9, 2010.
U.S. Appl. No. 12/813,287, filed Jun. 10, 2010.
U.S. Appl. No. 12/819,351, filed Jun. 21, 2010.
U.S. Appl. No. 12/819,376, filed Jun. 21, 2010.
U.S. Appl. No. 12/831,034, filed Jul. 6, 2010.
U.S. Appl. No. 12/839,251, filed Jul. 19, 2010.
U.S. Appl. No. 12/839,281, filed Jul. 19, 2010.

* cited by examiner

DYNAMICALLY CONTROLLED KEYBOARD

CROSS REFERENCE TO RELATED APPLICATIONS

This application takes priority under 35 U.S.C. 119(e) of U.S. Provisional Application No. 60/814,363, filed Jun. 15, 2006 entitled "DYNAMICALLY CONTROLLED KEYBOARD" by Smith et al that is also incorporated by reference in its entirety

BACKGROUND

This invention generally relates to peripheral devices for use with computers and similar information processing devices.

A computer keyboard is a peripheral modeled after the typewriter keyboard. Keyboards are used to input text and characters into the computer and to control the operation of the computer. Physically, computer keyboards are an arrangement of rectangular or near-rectangular buttons or "keys," which typically have engraved or printed characters. In most cases, each depressing of a key corresponds to a single symbol. However, some symbols require that a user depresses and holds several keys simultaneously, or in sequence. Depressing and holding several keys simultaneously, or in sequence, can also result in a command being issued that affects the operation of the computer, or the keyboard itself.

There are several types of keyboards, usually differentiated by the switch technology employed in their operation. The choice of switch technology affects the keys' responses (i.e., the positive feedback that a key has been depressed) and travel (i.e., the distance needed to push the key to enter a character reliably). One of the most common keyboard types is a "dome-switch" keyboard, which works as follows. When a key is depressed, the key pushes down on a rubber dome sitting beneath the key. The rubber dome collapses, which gives tactile feedback to the user depressing the key, and cause a conductive contact on the underside of the dome to touch a pair of conductive lines on the Printed Circuit Board (PCB) below the dome, thereby closing the switch. A chip in the keyboard emits a scanning signal along the pairs of lines on the PCB to all the keys. When the signal in one pair of lines changes due to the contacting, the chip generates a code corresponding to the key connected to that pair of lines. This code is sent to the computer either through a keyboard cable or over a wireless connection, where it is received and decoded into the appropriate key. The computer then decides what to do on the basis of the key depressed, such as display a character on the screen, or perform some action. Other types of keyboards operate in a similar manner, with the main differences being how the individual key switches work. Some examples of other keyboards include capacitive keyboards, mechanical-switch keyboards, Hall-effect keyboards, membrane keyboards, roll-up keyboards, and so on.

The most common physical arrangements of keys on keyboards in Western countries are based on the "QWERTY" layout (including closely related variants, such as the French "AZERTY" layout). However, in countries that do not use the Western alphabet, the keyboard layout is often very different. Most computers allow a user can change the keyboard settings, or keyboard locale, for example, from a conventional QWERTY keyboard layout to a keyboard layout for the Cyrillic alphabet. Typically, there is an indication on the computer screen telling the user knows what keyboard locale is currently selected. However, nothing about the physical appearance of the keys themselves changes when a different locale is selected, so there is no way for a user to know what Cyrillic character will appear on the screen when a particular English key is depressed, unless the user has already memorized the locations of all the Cyrillic characters on the keyboard.

Furthermore, many software applications makes extensive use of the various function keys on a computer keyboard, as well as the "Ctrl" and "Alt" keys, and various combinations thereof with the alphanumeric keys on the keyboard. It is often difficult for a user to remember what operations the various function keys perform in different software applications, and what effect depressing a "Ctrl" or "Alt" key in combination with an alphanumeric character will have in various software applications. Therefore, in view of the above discussion, there is a need for a better way to indicate to a user what the effect will be of depressing a particular key or combination of keys on a peripheral device, such as a keyboard.

SUMMARY

Broadly speaking, the present invention provides methods and apparatus for dynamically altering the key faces of keyboard keys, such that they show an accurate representation of what action will occur when a particular key is depressed. In one embodiment the altering key faces are accomplished by placing a number of organic light emitting diodes (OLEDs) on each key face, and using an application specific integrated circuit (ASIC) placed inside each key to turn on and turn off the respective diodes. The respective ASICs are controlled by signals originating from the software application in which the user is currently working and by the selected language locale. As a result, the users always have current and accurate information in front of them about what will happen when a particular key is depressed on the keyboard, and there is no need to memorize what actions particular key depressions will cause.

In general, in one aspect, the invention provides methods and apparatus, including computer program products, implementing and using techniques for providing a computer peripheral including one or more keys. Each key has several light emitting diodes disposed on a face of the key. Each of the light emitting diodes can switch on or off in response to a data signal received from an application specific integrated circuit dedicated to the key.

Advantageous implementations can include one or more of the following features. The computer peripheral can be a computer keyboard. The light emitting diodes can be organic light emitting diodes. The light emitting diodes can be placed in a dot matrix pattern on each key and display symbols indicating an action that will be performed by a computer connected to the peripheral when the key is depressed by a user. The light emitting diodes can be switched on and off with a predetermined frequency to create animation effects on the key face. The application specific integrated circuit can receive a data signal from a computer connected to the peripheral, which contains information about which light emitting diodes among the light emitting diodes to switch on and which light emitting diodes among the light emitting diodes to switch off for the key associated with the application specific integrated circuit. The application specific integrated circuit and the light emitting diodes for two or more keys can operate together under control of the computer in order to display large symbols across the faces of the two or more keys. The application specific integrated circuit can receive a data signal that is overlayed on a power signal from a computer connected to the peripheral. The application specific integrated circuit can store a pattern to be displayed by the light emitting diodes in an internal memory as a bitmap. The application specific integrated circuit can have only two electrical connections to the peripheral. A first electrical connection can provides a power and a data signal and a second electrical connection provides a ground signal.

In general, in another aspect, the invention provides methods and apparatus, including computer program products, implementing and using techniques providing a key for a peripheral device. The key includes an application specific integrated circuit disposed inside the housing of the key and several user feedback elements disposed on a face of the housing of the key and coupled to the application specific integrated circuit to receive signals from the application specific integrated circuit.

In general, in another aspect, the invention provides a computer system. The computer system includes a peripheral having several keys for receiving user input, a central processing unit for processing the user input received through the peripheral, and a display for displaying the user input processed by the central processing unit. The keys each contain an application specific integrated circuit and several organic light emitting diodes disposed on the respective key faces, each organic light emitting diode being controlled by the application specific integrated circuit for the key. The central processing unit provides instructions to the application specific integrated circuits to cause the organic light emitting diodes to display information indicative of an action that will be performed when a user depresses a key.

In general, in another aspect, the invention provides methods and apparatus, including computer program products, implementing and using techniques for manufacturing a key having a housing with a dynamically changeable face. A glass substrate forming a top face of the key is provided. Several organic light emitting diodes are formed on the glass substrate. The forming of the organic light emitting diodes include: forming an anode; forming a first transport layer adjacent to the anode; forming an emission layer adjacent to the first transport layer; forming a second transport layer adjacent to the emission layer; and forming a cathode adjacent to the second transport layer. An application specific integrated circuit is coupled to the organic light emitting diodes, and key housing sidewalls and supporting structures are attached to the glass substrate with the organic light emitting diodes and to the application specific integrated circuit.

Embodiments of the invention can include one or more of the following advantages. One advantage is that keyboards and other peripherals are made much more user friendly and the users' experience is be enhanced, since there is a direct correspondence between what is displayed on the keyboard faces and the action that occurs when the corresponding keys are depressed. This minimizes the users' need to memorize various keyboard layouts, for example, for different locales. Another advantage is that the keyboards, and other peripherals, can serve as auxiliary displays in addition to the regular computer screen to show images or messages to the users. Yet another advantage is that the manufacturing cost of the keyboard can be kept reasonably low since standard components used in conventional keyboards are largely used. A further advantage is that the use of OLEDs allows low power consumption, while maintaining great flexibility in static and dynamic display abilities.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
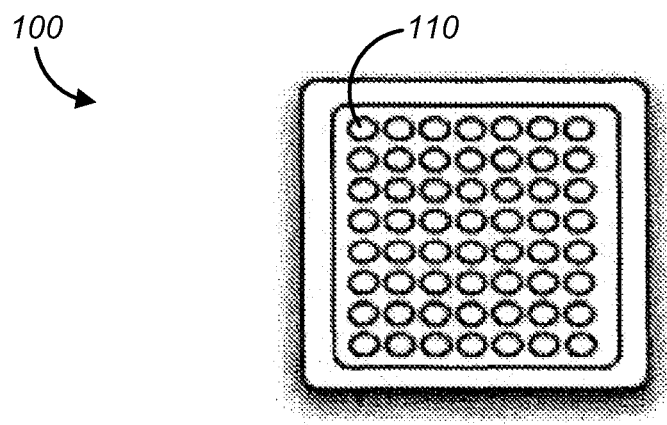
FIGS. 1A and 1B show schematic views of a keyboard key in accordance with one embodiment of the invention.
Figure 1B:
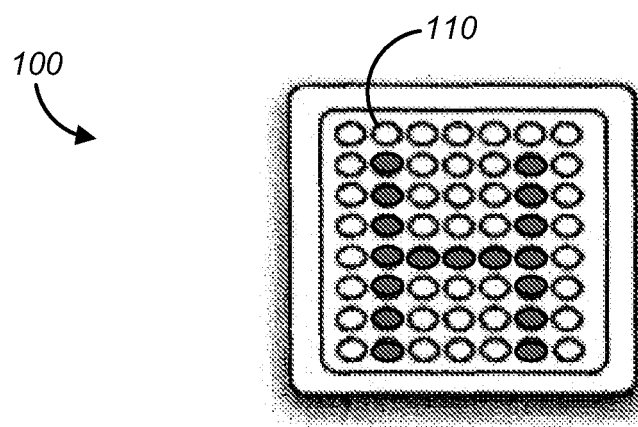

FIGS. 1A and 1B show schematic views of a keyboard key (100) in accordance with one embodiment of the invention. As can be seen in FIGS. 1A and 1B, the key (100) has a square array of small organic light emitting diodes (OLEDs) (110), which can be individually switched on and off using an ASIC disposed below the surface of the key (100). As will be described in further detail below, the respective ASICs are software controlled. It should be noted that the embodiment shown in FIGS. 1A and 1B has an array of nine by nine OLEDs, that is, similar to a print head in the earlier dot matrix printers, but that a larger or smaller number of OLEDs can be used, based on the space and power delivery constraints. Also, the OLEDs can be organized in other fashions than square arrays, depending on what kinds of characters or patterns the individual keys are required to display. FIG. 1A shows the key in a first state in which all the OLEDs are switched off, and FIG. 1B shows the key in a second state in which selected OLEDs have been illuminated under control of the computer to display the letter "H."

In the illustrated embodiment, OLEDs are a preferred type of LEDs due to their compactness, such that it is easy to fit a large number of OLEDs on a single key. It should however be noted, that the principles described herein are also applicable to other types of LEDs or light emitting devices, as long as they are sufficiently small to meet the display requirements of the respective keys on a keyboard. As is well known to those of ordinary skill in the art, An LED is a special type of semiconductor diode. Like a normal diode, an LED includes of a chip of semiconducting material doped with impurities to create a p-n junction structure. As in other diodes, current flows from the p-side, or anode to the n-side, or cathode, but not in the reverse direction. Charge-carriers (i.e., electrons and holes) flow into the junction from electrodes with different voltages. When an electron meets a hole, the electron falls into a lower energy level, and releases energy in the form of a photon. The wavelength of the emitted light depends on the bandgap energy of the materials forming the p-n junction. In silicon or germanium diodes, the electrons and holes recombine by a non-radiative transition, which produces no optical emission, whereas the materials used for an LED have a direct bandgap with energies corresponding to near-infrared, visible or near-ultraviolet light.

In an OLED, the emission layer is an organic compound, such as a small organic molecule in a crystalline phase, or a polymer. When the emission layer is polymeric, varying amounts of OLEDs can be deposited in rows and columns using simple "printing" methods. While inorganic LEDs are point sources of light, OLEDs are available as distributed sources. In addition to their small size and variable shapes, one of the great benefits of OLEDs is that they have vary low power consumption, which make them suitable for applications like the ones described herein.

Figure 2:
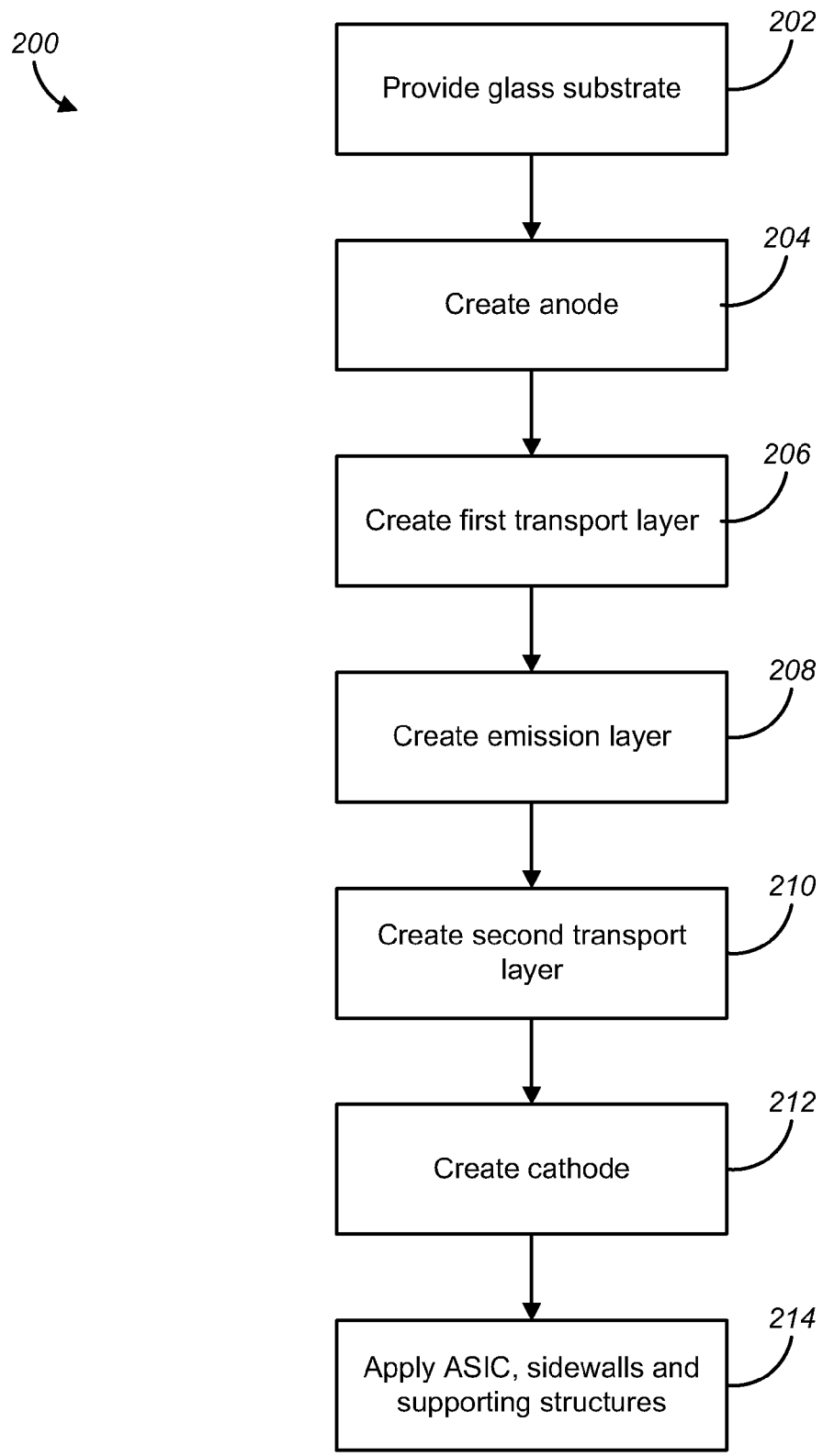
FIG. 2 is a flowchart of a process for creating a keyboard key in accordance with one embodiment of the invention.
Figure 3:
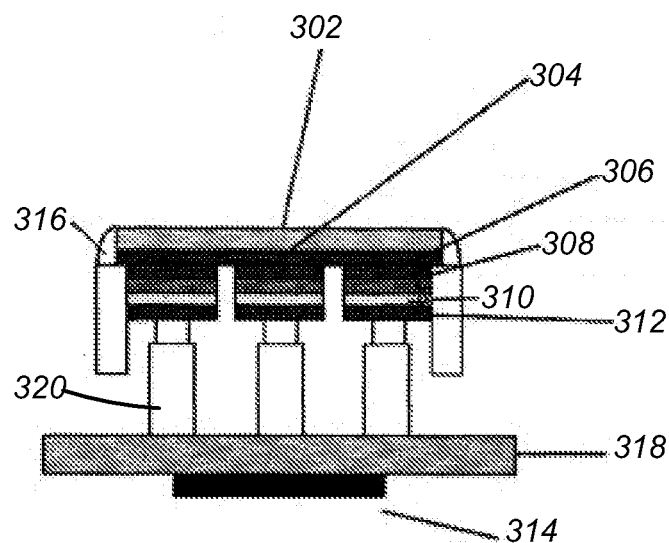
FIG. 3 shows a schematic side view of a keyboard key in accordance with one embodiment of the invention

FIG. 2 shows a basic flowchart of a process (200) for creating a keyboard key (100) with a number of OLEDs deposited thereon, and FIG. 3 shows a schematic side view of a keyboard key (100) in accordance with one embodiment of the invention. As can be seen in FIG. 2, process (200) starts by providing a glass substrate (302) on which the OLEDs will be deposited (step 202), and placing the substrate in a vacuum chamber. As can be seen in FIG. 3, in the assembled key (100) the glass substrate (302) will serve as the face of the key (100). In the embodiment shown in FIG. 3, the surface of the glass substrate (302) that the users will touch when depressing the key (100) is flat, but it should be realized that the surface may also be curved, which may improve the "feel" of the key and thus make it more user friendly.

Next, the process continues by creating an anode (304) on the glass substrate (step 204). In one embodiment, this step is performed by stamping an adhesive material on the glass substrate (302) and then injecting anode material into the chamber, which contacts with the adhesive material. It should be noted that the anode (304) is transparent, so that light from the OLEDs emission layer can pass through the anode (304) and the glass substrate (302) such that it is visible on the top surface of the key (100). Any conventional OLED anode materials can be used, such as indium tin oxide, for example. The adhesive is typically the same type of adhesive that is conventionally used in OLED manufacturing processes, as is well known to those of ordinary skills in the art. In another embodiment, the anode (304) is created by simply attaching a piece of metal to the glass substrate (302) and subjecting it to heat on order to fuse the glass substrate (302) and the metal (304) together.

After creating the anode (304), the process creates the first transport layer (306) on top of the anode (304) (step 206). In one embodiment, the first transport layer (306) is created by stamping a second adhesive pattern onto the anode (304), injecting the first transport layer material into the chamber, and allowing it to contact with the adhesive material.

Next, the process creates the organic emission layer (308) on top of the first transport layer (306) (step 208). In one embodiment, the organic emission layer (308) is created by stamping a third adhesive pattern onto the first transport layer (306), injecting the organic emission layer material into the chamber, and allowing it to contact with the adhesive material. The choice of material for the organic emission layer determines the color of the OLED, since different materials have different bandgaps.

After creating the organic emission layer (308), the process creates the second transport layer (310) on top of the organic emission layer (308) (step 210). In one embodiment, the second transport layer (310) is created by stamping a fourth adhesive pattern onto the organic emission layer (308), injecting the second transport layer material into the chamber, and allowing it to contact with the adhesive material.

The last step of creating the OLEDs is to create the cathode (312) on top of the second transport layer (310) (step 212). In one embodiment, the cathode (312) is created by stamping a fifth adhesive pattern onto the second transport layer (310), injecting the cathode material into the chamber, and allowing it to contact with the adhesive material. Suitable materials for the cathode include aluminum or calcium. It should be noted that in the above described process (200), the adhesive materials that are used are very thin and disappear during the manufacturing process, so that after step 212, the key (100) contains only the layers shown in FIG. 3, that is, the glass substrate (302), the anode (304), the first transport layer (306), the emission layer (308), the second transport layer (310), and the cathode (312).

Once the cathode (312) has been created, the manufacturing of the OLEDs on the key (100) is complete, and the rest of the key (100) is assembled (step 214). This includes, among other things, applying the ASIC (314) inside the key (100) and coupling it to the respective OLEDs and attaching the sidewalls (316) of the key (100), which ends the process (200). The key (100) can then be assembled on to a printed circuit board (PCB) (318) in a conventional manner. In one embodiment, the key (100) is attached to the PCB (318) through a number of posts (320), which stabilize the key (100) and allow it to move up and down in a controlled manner when the key (100) is depressed by a user. The posts (320) can be made of metal, which allows one or more of them to work as conductors in order to provide power and ground signals to the ASIC (314), as will be described in further detail below. It should be noted that the posts (320) are merely one example of a conductive assembly. Any assembly that allows energy to be passed vertically from the PCB (318) at the bottom of the keyboard to the respective ASICs (314) inside the keys can be used. In some embodiments, the connection between the ASIC (314) and the OLEDs is an optical connector, such that information can be transferred from the ASIC (314) to the respective OLEDs without the need of a physical connection.

Figure 4:
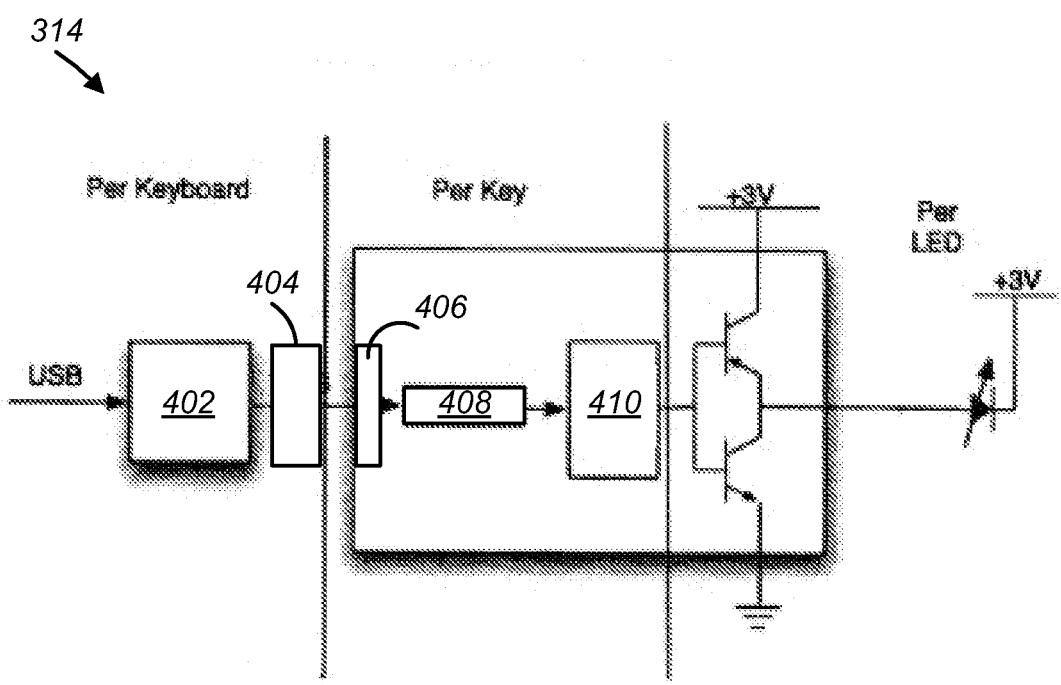
FIG. 4 shows a schematic block diagram of an application specific integrated circuit in accordance with one embodiment of the invention.

FIG. 4 shows a schematic block diagram of an ASIC (314) that is built into one of the keys (100) in accordance with one embodiment of the invention. In the shown embodiment, the keyboard controller (402) receives a bitmap from the computer host memory for each of the keys (100) on the keyboard. The bitmaps can be sent from the computer to the keyboard controller (402) through any conventional mode of communication. In the embodiment shown in FIG. 4, the bitmaps are sent over a universal serial bus (USB) connection. Each bitmap contains information about which OLEDs should be illuminated and which OLEDs should be dark for that particular key (100).

The keyboard controller (402) passes the bitmaps on to the respective ASIC (314) in each key (100) as a TWS signal. In order to minimize the electrical connections for each ASIC (314), a power signal is also added to the TWS signal by a conventional adder circuit (404), before the TWS signal is received by the respective ASICs (314). In this configuration, each ASIC (314) needs only two electrical connections, that is, the combined power and data signal on the one hand, and ground, on the other hand. As is well known to those of ordinary skill in the art, minimizing the number of electrical connections for each ASIC (314) results in significantly improved reliability of the keyboard.

Once the ASIC (314) receives the combined TWS and power signal, the signal is filtered by a filter (406) to separate the data and power components. The data component of the signal proceeds to a serial interface (408) and to an internal memory (410) on the ASIC (314). The ASIC (314) then reads the information stored in the internal memory (410) for the respective OLEDs and sends the power signal to the OLED if the OLED is to be illuminated. This causes a current to flow between the anode and cathode of the OLED, as discussed above, and as a result the OLED is illuminated. If the OLED is to remain dark, no power signal is sent to the OLED.

Figure 5A:
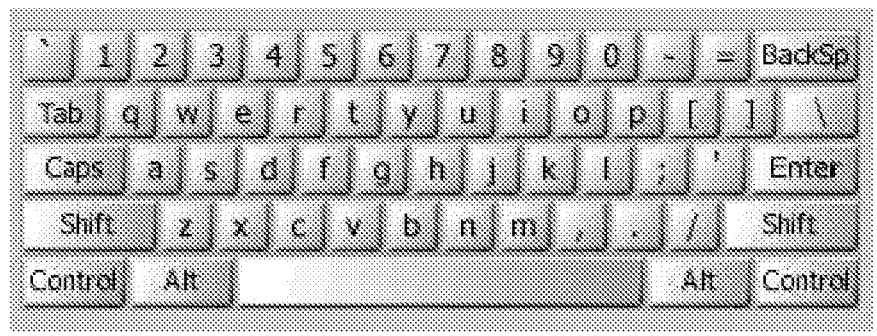
FIGS. 5A-5C show various types of keyboard layouts that can be realized dynamically in accordance with various embodiments of the invention.
Figure 5B:
Figure 5C:
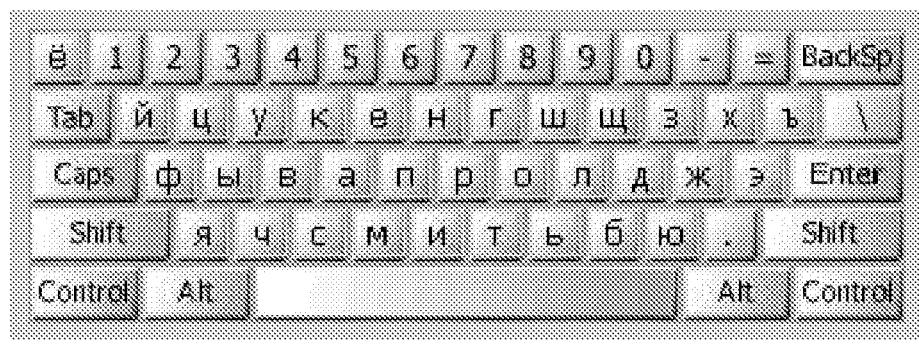

FIGS. 5A-C are schematic drawings that illustrate one aspect of the invention. FIG. 5A shows a conventional American-style QWERTY keyboard, FIG. 5B shows a Swedish-style QWERTY keyboard and FIG. 5C shows a Russian-style keyboard. As can be seen in FIGS. 5A-C, the physical organization of the keys is the same in all the keyboards, but the symbols that are displayed on the keys are different for at least some of the keys. This change can occur dynamically, for example, as the user chooses different locales or changes between various software applications that use different keyboard layouts. Alternatively, the keyboard settings may also be associated with user profiles, such that when a Swedish user logs on to the computer, the Swedish keyboard layout is selected, whereas when an American user logs on to the computer, the American keyboard layout is selected.

As can be realized by those of ordinary skill in the art, a wide range of software applications can be developed by which the keyboard settings can be controlled. For example, various drawing programs, such as Adobe Photoshop, can be enhanced such that whenever a user presses a function key or an auxiliary key, such as the Shift or the Ctrl key, the other keys on the keyboard change dynamically to display various tool functions that are activated by the function keys or auxiliary keys.

In some applications, the keys can be animated. The USB format currently supports data transfer of up to 1 MB/second, so the OLEDs on the different keys can be changed dynamically to achieve blinking or strobing effects. In order for users to perceive "moving" images, the keys need to be refreshed with a frequency of about 10 Hz (i.e. 10 frames per second, or every 100 ms), which is a very slow rate in computer contexts. The animations are not limited to involving single keys, but multiple keys can operate together, for example, to show a large image or some kind of company logotype or personal message. The cooperation of keys also allows the larger images to pan across the keyboard in a "moving banner" fashion, similar to what can be seen in sports arenas or roadside advertising displays.

In other applications, users may "design" their own keyboards, for example, by showing an empty keyboard and a set of icons on the screen, and allowing a user to "drag and drop" icons to the respective keys, using his computer mouse. Various types of teaching applications are also possible, for example, software may teach a user to type by providing on-screen instructions for what fingers to use for particular keys and then flashing or illuminating the corresponding keys on the keyboard, while keeping the remaining keys dark, and so on.

Of course, various types of gaming applications are also possible, for example, in which the user quickly needs to depress a key that is being illuminated, or chase a moving key around the keyboard, to accomplish some goal set by the game developers. Thus, there is an almost endless set of areas in which various embodiments of the invention enhance the users' experience when using a keyboard or other type of peripheral that employ the principles of the invention.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations of the invention have been described. Nevertheless, it will be understood that various modifications may be made without departing from the spirit and scope of the invention. For example, the above invention has been discussed with respect to embodiments where the ASICs control OLEDs, but the ASICS can also control various types of haptic feed back mechanisms that can be built into the keys such that the user gets a tactile response of a particular kind when a particular key is depressed. Furthermore, the invention has been described with reference to computer keyboards. However, the same ideas can be applied to any type of keys, such as the keys on a joystick and game pad controller, the buttons on a mouse, or similar peripheral. The above discussion has been focused on various functional issues, but it should also be realized that the key faces can also be changed for purely artistic reasons, for example to display a particular symbol or sequence of symbols when a computer or electrical appliance, such as a stereo or DVD player is not in use. Many variations and combinations can be envisioned by people skilled in the art. Accordingly, other embodiments are within the scope of the following claims.

The invention claimed is:

1. An electronic device comprising:
   a key pad having a plurality of mechanically responsive keys;
   each key of the plurality of keys to directly responds to an application of force thereon by providing an input signal to the electronic device, and comprises:
   a single glass substrate forming a top face of said each key on which the application of force is applied causing said each key to move from a neutral state to a compressed state;
   a plurality of organic light emitting diodes (OLEDs) disposed in a plane below the single glass substrate;
   a plurality of depressible posts controlling a movement of the top face of said each key from the neutral state to the compressed state, wherein each depressible post of the plurality of posts electrically connects to a different one of the plurality of OLEDs to a printed circuit board; and
   an application-specific integrated circuit (ASIC) is electrically connected to each OLED of the plurality of OLEDs through a corresponding one of the plurality of posts;
   wherein said each OLED of the plurality of OLEDs is individually controllable by the ASIC to cooperate in real time with each other to present a composite image at the key pad, the composite image comprising partial images cooperatively presented by the plurality of OLEDs of said each key of the plurality of keys, and wherein the top face of said each key of the plurality of keys is dynamically altered by using the ASIC to turn on and off certain OLEDs of the plurality of the OLEDs.

2. The electronic device of claim 1, wherein said each key of the plurality of the keys further comprises a display element, and the display element of said each key of the plurality of keys comprises:
   a transparent organic light emitting diode (OLED) anode;
   an OLED emission layer element disposed below the transparent OLED anode; and
   an OLED cathode disposed below the OLED emission layer element such that when said each individually controllable OLED of the plurality of OLEDs is activated, the OLED emission layer element produces light that travels through the transparent OLED anode and through the single glass substrate.

3. The electronic device of claim 2, wherein the display element of said each key of the plurality of keys further comprises: a first transport layer element disposed in between the transparent OLED anode and the OLED emission layer element; and a second transport layer element disposed in between the OLED emission layer element and the OLED cathode.

4. The electronic device of claim 2, wherein a first transport layer element is formed by stamping an adhesive pattern onto the transparent OLED anode and injecting first transport layer material into a chamber, allowing the first transport layer material to contact the adhesive pattern.

5. The electronic device of claim 1, wherein a display element of said each key of the plurality of keys is switched on with a predetermined frequency to create animation effects on the top face of said each key of the plurality of keys.

6. The electronic device of claim 1, wherein the ASIC is configured to coordinate with an ASIC of one or more other keys of the plurality of keys in order to control the plurality of keys simultaneously to display a single symbol across the plurality of keys.

7. The electronic device of claim 1, wherein said each key of the plurality of keys is controlled differently based on an application program running on a computer coupled to the electronic device.

8. The electronic device of claim 1, wherein said each key of the plurality of keys is controlled differently based on an application program running on the electronic device.

9. A method of manufacturing a keyboard arranged to present a composite image, the keyboard including a plurality of keys, wherein each key of the plurality of keys having a dynamically changeable top face, the method comprising:
   providing a glass substrate having an upper surface forming the top face of said each key, wherein said each key directly responds to an application of force by providing an input signal to an electronic device;
   forming an array of organic light emitting diodes (OLEDs) on the glass substrate, wherein each OLED in the array of the OLEDs to be switched on and off individually using an application specific integrated circuit (ASIC), and the ASIC dynamically alters the top face of said each key of the plurality of keys, wherein said forming the array of the OLEDs includes:
   forming an optically transmissive anode on a bottom surface of the glass substrate,
   forming a first transport layer on top of the anode;
   forming an emission layer on top of the first transport layer;
   forming a second transport layer on top of the emission layer; and
   forming a cathode adjacent to the second transport layer;
   coupling each different depressible electrically conductive post of a plurality of depressible electrically conductive posts to said each OLED in the array of the OLEDs and to the ASIC, said each different depressible electrically conductive post of the plurality of depressible electrically conductive posts controlling a movement of the top face of said each key of the plurality of keys from a neutral state to a compressed state; and
   attaching key housing sidewalls and supporting structures to the glass substrate, wherein said each OLED in the array of the OLEDs for said each key of the plurality of keys is individually controllable by the ASIC to cooperate in real time with each other to present the composite image at the keyboard, the composite image comprising partial images cooperatively presented by the array of the OLEDs of said each key of the plurality of keys.

10. The method of claim 9 wherein the ASIC is configured to display a single symbol partially on a first key of the plurality of keys and partially on a second key of the plurality of keys.

11. The method of claim 9, wherein the ASIC is configured to periodically switch on and off the array of the OLEDs on said each key of the plurality of keys with a predetermined frequency to create animation effects on the top face of said each key of the plurality of keys.

12. The method of claim 9, wherein said each key of the plurality of keys is located in a computer keyboard.

13. The method of claim 9, wherein the array of the OLEDS are organized in a non-square pattern.

14. A computer system comprising:
  a peripheral device having a plurality of keys for receiving a direct user input, wherein:
  each key of the plurality of keys includes a plurality of organic light emitting diodes (OLEDs) arranged to present at least a partial image at a glass substrate top face of said each key of the plurality of keys on which a force is applied causing said each key of the plurality of keys to move from a neutral state to a compressed state and to provide an input signal;
  said each key of the plurality of keys having the plurality of OLEDs, wherein the plurality of OLEDs create a dynamically changeable composite image presented by the peripheral device by cooperatively combining respective partial images of said each key of the plurality of keys;
  each OLED of the plurality of OLEDs is electrically connected via each separate electrically conductive post of a plurality of electrically conductive posts to a corresponding application specific integrated circuit (ASIC), wherein the ASIC provides information to and controls an operation of the plurality of OLEDs;
  said each separate electrically conductive post of the plurality of electrically conductive posts at least partially controls a movement of the top face of said each key of the plurality of keys from the neutral state to the compressed state; and
  the plurality of OLEDs to display the respective partial images of said each key of the plurality of keys in accordance with the information received from the ASIC, the respective partial images used to create the dynamically changeable composite image by the peripheral device;
  wherein the top face of said each key of the plurality of keys is dynamically altered by using the ASIC to turn on and off certain OLEDs of the plurality of OLEDs.

15. The computer system of claim 14, wherein the ASIC is further configured to operate a game wherein a user interacts with the plurality of OLEDs for the plurality of keys.

16. The computer system of claim 15, wherein the game involves the user attempting to depress a key of the plurality of keys that is illuminated before a different key of the plurality of keys is illuminated.

17. The computer system of claim 15, wherein the game involves the user chasing a moving key of the plurality of keys around a keyboard, wherein the moving key moves by virtue of the plurality of OLEDs of adjacent keys of the plurality of keys switching between on and off.

18. The computer system as recited in claim 14, wherein the composite image is a company logo.

\* \* \* \* \*